Figure 1:
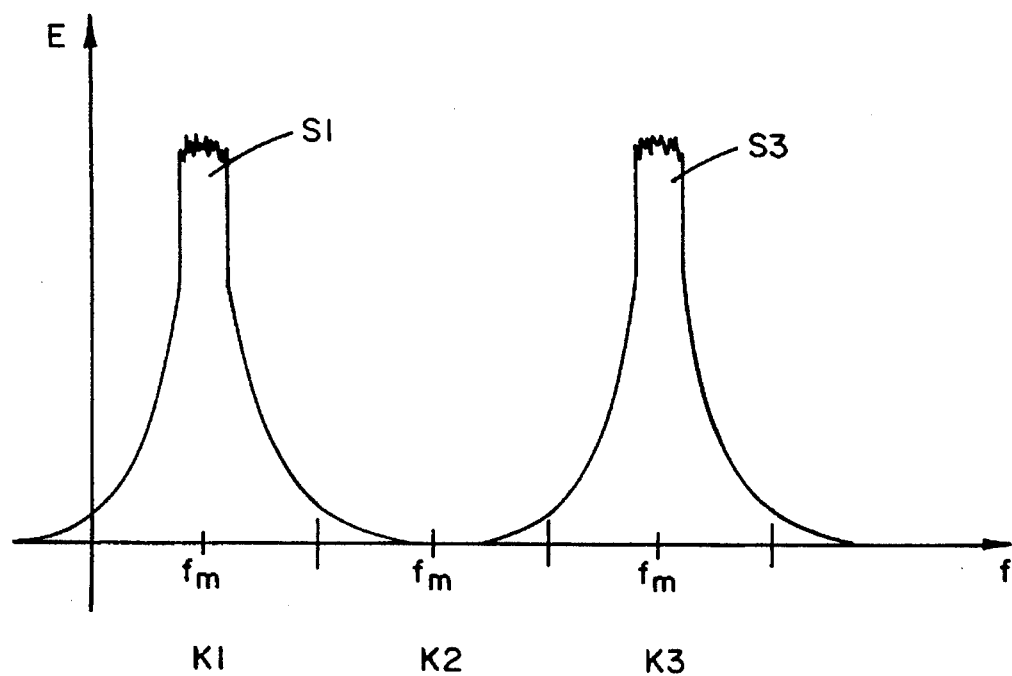

United States Patent
Müller

[11] Patent Number: 5,568,480
[45] Date of Patent: Oct. 22, 1996

[54] METHOD OF DETERMINING A FREE CHANNEL IN FDM RADIOCOMMUNICATION SYSTEMS

[75] Inventor: Werner Müller, Roth, Germany

[73] Assignee: Grundig E.M.V. Elektro-Mechanische Versuchsanstalt Max Grundig, Fuerth, Germany

[21] Appl. No.: 416,723

[22] PCT Filed: Oct. 11, 1993

[86] PCT No.: PCT/EP93/02784

§ 371 Date: Apr. 11, 1995

§ 102(e) Date: Apr. 11, 1995

[87] PCT Pub. No.: WO94/09584

PCT Pub. Date: Apr. 28, 1994

[30] Foreign Application Priority Data

Oct. 21, 1992 [DE] Germany .......................... 42 35 453.6

[51] Int. Cl.$^6$ ................................. H04B 7/12; H04J 1/02
[52] U.S. Cl. ................ 370/69.1; 455/34.1; 455/34.2; 455/226.2
[58] Field of Search ............... 370/69.1, 76, 70, 370/121, 120, 95.1; 455/33.1, 33.2, 32.1, 67.4, 161.1, 161.3, 34.1, 34.2, 58.2, 62, 226.2

[56] References Cited

U.S. PATENT DOCUMENTS 4,166,927 9/1979 Hamaoki ................................. 379/60

FOREIGN PATENT DOCUMENTS

| 0244872 | 11/1987 | European Pat. Off. . |
|---|---|---|
| 0283401 | 9/1988 | European Pat. Off. . |
| 0282087 | 9/1988 | European Pat. Off. . |
| 0298750 | 1/1989 | European Pat. Off. . |
| 0359231 | 1/1989 | European Pat. Off. . |
| 0299515 | 1/1989 | European Pat. Off. . |
| 0361465 | 4/1990 | European Pat. Off. . |
| 3508900 | 9/1986 | Germany . |
| 3907568 | 9/1990 | Germany . |
| WO92/11736 | 7/1992 | WIPO . |

OTHER PUBLICATIONS

Hulbert et al., "The Relationship Between Adjacent Channel Rejection and Spectral Efficiency for Advanced Cordless Telephones," *IEEE/IEICE Global Telecommunications Conference*, Bd. 3, Nov. 15, 1987, Tokyo.

*Primary Examiner*—Melvin Marcelo
*Assistant Examiner*—Melissa Kay Carman
*Attorney, Agent, or Firm*—Scully, Scott, Murphy & Presser

[57] ABSTRACT

In radio transmission systems having a number of radio channels available for transmission, it is necessary to recognize a transmission channel as idle. One known way of doing this is to measure the field strength on the transmission channel and carry out a threshold decision. As soon as the field strength in a transmission channel is below a preset value, this transmission channel is recognized as idle. In measuring field strength, the field strength is averaged over the entire bandwidth of the transmission channel. As a result, a transmission channel that experiences interference from the signals on its adjacent channels may not be recognized as idle, although the adjacent-channel interference has little effect on the transmission quality. The new method makes it possible to recognize the signal present in a transmission channel by means of numerous narrowband field strength measurements. The transmission bandwidth can then be better utilized, as especially adjacent-channel interference and other forms of interference occurring only at the upper and lower ends of the frequency range of the transmission channel are recognized without the transmission channel's being recognized as occupied. The method as per the invention can be used in all radio transmission systems with independent channel search.

10 Claims, 1 Drawing Sheet

METHOD OF DETERMINING A FREE CHANNEL IN FDM RADIOCOMMUNICATION SYSTEMS

DESCRIPTION

The invention relates to a method of classifying incoming signals in frequency-division multiplex radiocommunication systems comprising a transmitter search device which scans the associated radiocommunication channels, and wherein a radiocommunication channel is recognized as being free (open for communication) if the measured electrical field strength in the radiocommunication channel is below a threshold value.

EP-A2-299 515 discloses a method of linking together a base station and a mobile section of a cordless telephone via a radiocommunication channel. In this method, the electrical field strength is first determined on priority channels. If the field strength on a priority channel is below a threshold value for a certain time, said priority channel is recognized as free and the transmission and reception frequency in the base station and mobile section are tuned to said priority channel.

A disadvantage of said method is that the sideband noise of a nearby transmitter in the adjacent channels may produce an electrical field strength which is large enough for the radio transmission channels to be incorrectly recognized as occupied.

DE-C2-35 08 900 relates to an arrangement for deriving a switching criterion for radio equipment from a field-strength measurement. This arrangement contains a comparator which compares the electrical field strength periodically measured in a communication channel with a threshold value. If the measured field strength is above the threshold value, a first number is added to a counter reading in an accumulator; if the measured field strength is below the threshold value, a second number is subtracted from the counter reading in the accumulator. If the counter reading in the accumulator falls below a certain value, the switching criterion is fulfilled and a change is made to another communication channel.

In the event of interference due to adjacent channels, however, this relatively expensive circuit arrangement achieves no improvement compared with methods in which only the field strength in the communication channel is measured.

EP-A2-298 750 discloses a cordless telephone in which the field strength is evaluated in a test channel in order to establish whether it is occupied. For this purpose, a comparison is made with a threshold value. In addition, the field strength in a communication channel is used to determine the transmission quality. As soon as the field strength in the communication channel is below a threshold value, a warning signal sounds. The user then has the option of inputting a lower threshold value so that the measured field strength is again above the threshold value. If the user does not select a lower threshold value for the field strength, the link is disconnected after a certain time.

In the case of this procedure, too, it is not possible to recognize interference due to adjacent channels. Furthermore, it is a disadvantage that a distinction cannot be made between noise and information on the communication channel.

EP-A2-359 231 discloses a cordless telephone in which it is ascertained whether the mobile section is situated inside or outside the radio service area. This decision is reached on the basis of a comparison of the incoming field strength with a threshold value. If the incoming field strength drops below the threshold value, the amplification of the incoming signal is reduced.

In the case of this cordless telephone, it is a disadvantage that a distinction cannot be made between a communication channel with interference and one without interference and, consequently, a signal without interference having low field strength can no longer be adequately amplified. The recognition of interference due to an adjacent channel is also not possible.

EP-A2-283 401 discloses a circuit arrangement which prevents an interference of two frequency-modulated signals. In this case, the incoming signal is amplified by a logarithmic amplifier and then fed to a comparator which compares the amplitude with a reference signal. If it is found that the incoming signal is disturbed by interference with another frequency-modulated signal transmitted in the same communication channel, the communication channel is changed.

A disadvantage of this circuit arrangement is that the communication channel is not changed because of interfering noise. In addition, a large expenditure on circuitry is necessary for the logarithmic amplifier and the interference detector. A further disadvantage is that a frequency-modulated signal is first broadcast in order to be able to detect an interference, as a result of which an information signal already transmitted in the communication channel by another transmitter may be subject to interference.

European Application EP-A2-244 872 discloses a circuit arrangement with which a check can be made on whether a radiocommunication channel is occupied. In this case, a test signal is transmitted and, at the same time, the field strength in the communication channel is measured. If the measured field strength is greater than the field strength expected on the basis of the transmitted test signal, interference with another signal is recognized and the communication channel is changed.

This procedure does not make it possible to recognize a communication channel as occupied without subjecting an information exchange already taking place via said channel to interference.

EP-A2-282 087 discloses a cordless telephone whose base station broadcasts a request to the associated mobile section to ascertain whether the communication channel used is free. If the base station receives from the mobile section a confirmation which has been transmitted via the same channel, the communication channel used is recognized as free.

This procedure has the disadvantage that strong interference occurs for other radiocommunication systems on the communication channel. A further disadvantage is that the communication channel is incorrectly recognized as free if the transmission of the request and the confirmation falls, for example, in a transmission interval of another radiocommunication device.

The object of the present invention is to test whether the bandwidth necessary for the transmission is free from interference in a communication channel. At the same time, any communication taking place via said channel should not be subject to interference.

This object is achieved, according to the invention, in that the electrical field strength is measured in a narrow-band measurement at several different incoming frequencies within the radiocommunication channel being checked to determine if it is free, and to distinguish between broad-band interference, narrow-band interference, and narrow-band information on the basis of the several measured field-strength values absolutely and/or as a result of a comparison of the field-strength values at the different incoming frequencies.

The procedure according to the invention enables a qualitative assessment of interference and other signals in the communication channel as a function of their frequency. This is achieved by a plurality of narrow-band measurements of the field strength at different frequencies within the communication channel. This makes it possible to distinguish between interference which occurs only in a small range at the upper and/or lower frequency limit of the communication channel and those which are approximately constant over the entire frequency range of the communication channel (noise). If interference occurs only at the upper and/or lower frequency limit of the communication channel, the communication channel is recognized as free and is cleared for setting-up a link since these frequency ranges are only of slight significance for an interference-free transmission.

The method according to the invention is further characterized in that the incoming signal is demodulated and the field strength of spectral components of the base-band signal and/or the field-strength distribution over the frequency are evaluated to detect a busy state of a communication channel and, in the event of a busy state, to recognize the information transmitted by the communication channel. This has the advantage that, as a result of the demodulation of the incoming signal and the investigation of different spectral components of the base-band signal, a further differentiation of the signals present in the communication channel is possible. In addition, it is consequently possible to distinguish between noise, speech and data communication.

The method according to the invention is further characterized in that the incoming signal is evaluated at the center frequency of the radiocommunication channel. This has the advantage that the upper and lower frequency limit of the communication channel and its centre frequency are best suited to classifying the signal present, since the signals which occur at the upper and lower frequency limit, which have only a slight influence on the transmission quality of the channel, have, on the other hand, a very strong influence on the centre frequency.

The method according to the invention is further characterized in that a busy state of the radiocommunication channel is recognized by the steady component of the base-band signal and its variation for a detuning of the carrier frequency. This has the advantage that the steady component of the base-band signal is best suited to checking the busy state of the communication channel since, in the case of a useful signal, it is a measure of the deviation from the centre frequency and can be determined by simple circuitry measures.

The method according to the invention is further characterized by determining if a particular radiocommunication channel in a cordless telephone or mobile telephone radiocommunication system is being used presently for communication, or alternatively is open to be seized and used for communication has the advantage that the communication channels can be very narrow or the transmitting power not exactly at the frequency limit of the communication channel must already have dropped to a very small value, and that even those communication channels are still recognized as free whose two adjacent channels are already occupied. As a result, the use of less expensive components is possible.

Figure 2:
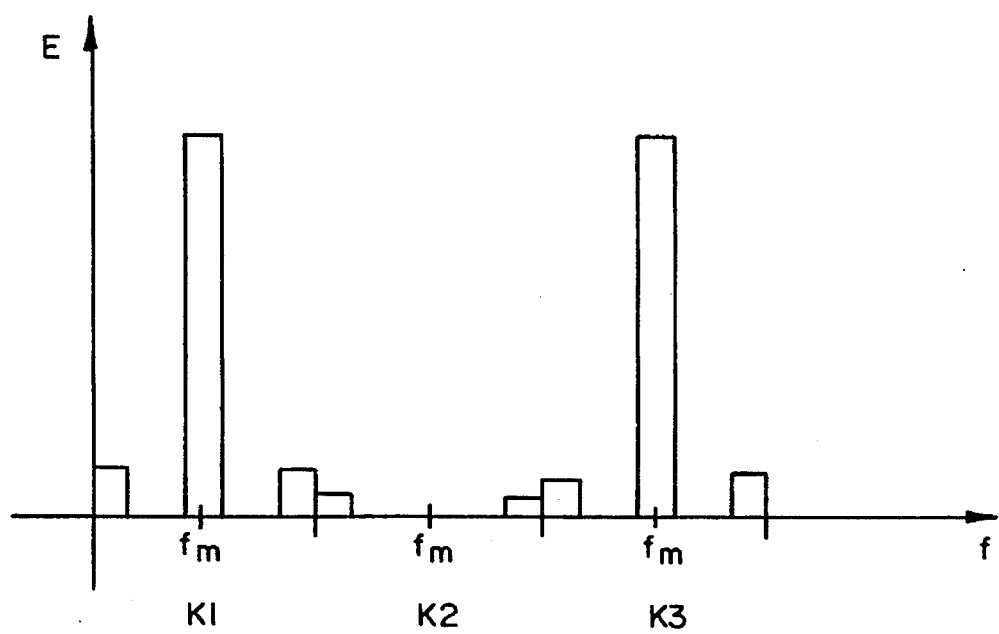

The invention is described and explained in greater detail below. In the drawing:

FIG. 1 shows a possible occupation of the transmission channels with broadcast signals and FIG. 2 shows the measured field strength distribution as a function of the frequency.

FIG. 1 shows the field strength E encountered for a plurality of communication channels K1 to K3. In this diagram, communication channel K1 is occupied by a broadcast signal S1, while communication channel K3 is occupied by a broadcast signal S3. Initially, no radiocommunication occurs in the communication channel K2 and the field strength E encountered in this communication channel is essentially due to the sideband noise of the broadcast signals S1 and S3. If a further broadcast signal S2 is to be transmitted, the associated transmitter first seeks a free communication channel. During this search, a plurality of narrow-band measurements of the field strength E in which the frequency interval in which the field strength is measured covers various frequency ranges is carried out for each communication channel to be checked. One measurement is carried out at the lower and one at the upper frequency limit of the communication channel, and one measurement is carried out at the centre frequency fm of the communication channel. For a bandwidth of the communication channel of, for example, 25 kHz, such as that which occurs in the case of a cordless telephone, the bandwidth covered by the measurement may be approximately 5 kHz.

In FIG. 2, the measured field strengths are plotted against frequency. The value of the field strength is determined in this case from the mean value of the field strength encountered over the bandwidth of the measurement. Since the communication channel K1 is occupied, a greater field strength value is measured at its centre frequency and the field-strength values at the upper and lower frequency limit of this communication channel are markedly smaller. Because of the absolute field-strength values and their distribution over the frequency, the communication channel K1 is recognized as occupied. Subsequent to this, field-strength measurements are carried out in the communication channel K2. Since the latter is not occupied, the field strength measured at the centre frequency fm is substantially smaller than in the case of communication channel K1. The field-strength values which are encountered at the upper and lower frequency limit of the communication channel K2 are due to adjacent-channel interference from channels K1 and K3 and are not markedly smaller than the field-strength values which are measured at the centre frequency fm of channel K2. From the absolute field-strength values and the field-strength distribution over the frequency, communication channel K2 is recognized as unoccupied. The transmitter S2 can consequently use the communication channel K2 for a transmission.

In addition to the field strength of the signal present in the respective communication channel and its distribution in the frequency interval of the communication channel, the demodulated signal itself or spectral components of the demodulated signal may provide a decision criterion for whether the communication channel is occupied or not. If only a noise signal is present in the communication channel, all the spectral components have approximately equal amplitudes. In particular, the steady component is constant.

If, on the other hand, a speech signal is being transmitted, the steady component of the base-band signal exhibits a strictly monotonic variation for a slight detuning of the carrier frequency. From this variation in the steady component in the base-band signal, it is possible to recognize that a useful signal is being transmitted via this communication channel.

If a data transmission is taking place in the communication channel, significant amplitude distributions over the frequency which can be recognized occur in the base-band signal in this case as well. In the case of an FSK modulation (frequency shift keying, one of the most used modulation methods for data transmission), only two different frequencies having significant amplitude occur and these frequencies are in the audible frequency range. Consequently it is possible to distinguish between an interference signal and a useful signal even in the case of a data transmission or if digital terminals are used.

I claim:

1. A method of signal classification in a frequency division multiplex radiocommunication system having a plurality of associated radiocommunication channels, to determine if a particular radiocommunication channel is being used for communication, or alternatively is open to be seized and used for communication, comprising measuring the electric field strength in the particular telecommunication channel by a plurality of narrow-band measurements at a plurality of different frequencies in the particular telecommunication channel, and evaluating the plurality of narrow-band measurements to determine if the particular telecommunication channel is presently being used for communication, or alternatively is open to be seized and used for communication.

2. A method of signal classification as claimed in claim 1, wherein the plurality of narrow band measurements are compared with each other.

3. A method of signal classification as claimed in claim 2, wherein the plurality of narrow band measurements at the plurality of different frequencies are used to distinguish between broad-band interference, narrow-band interference, and narrow-band information.

4. A method of signal classification as claimed in claim 1, further including scanning the associated radiocommunication channels with a transmitter search device, and determining that a particular radiocommunication channel is open if the measured electrical field strength in the particular radiocommunication channel is below a threshold value.

5. A method of signal classification as claimed in claim 1, further including demodulating a signal in a particular telecommunication channel to derive a base-band signal, and evaluating the electric field strength of spectral components of the derived base-band signal to determine if the particular radiocommunication channel is being used.

6. A method of signal classification as claimed in claim 5, wherein the step of evaluating the electric field strength includes the step of distinguishing between noise, speech, and data communication on the particular radiocommunication channel.

7. A method of signal classification as claimed in claim 5, further including evaluating the field strength distribution of the base-band signal.

8. A method of signal classification as claimed in claim 5, including recognizing a busy state of a particular radiocommunication channel by the steady component of the base-band signal and its variation for a detuning of the carrier frequency.

9. A method of signal classification as claimed in claim 1, further including evaluating a signal in a particular telecommunication channel at the center frequency of the particular radiocommunication channel and also near the upper and lower frequency limits of the particular radiocommunication channel.

10. A method of signal classification as claimed in claim 1, including determining if a particular radiocommunication channel in a cordless telephone or mobile telephone radiocommunication system is being presently used for communication, or alternatively is open to be seized and used for communication.

* * * * *